Dec. 18, 1951     J. BERGMANS ET AL     2,578,962
VEHICLE LAMP WITH AN OPTICAL SYSTEM
FOR UNIFORM ROAD LIGHTING
Filed May 7, 1946
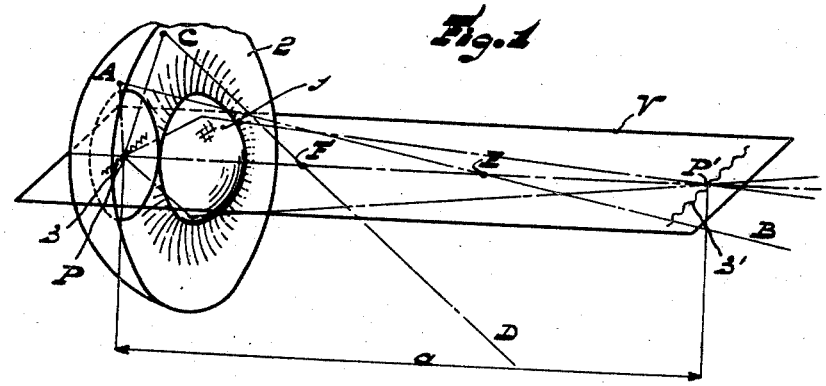
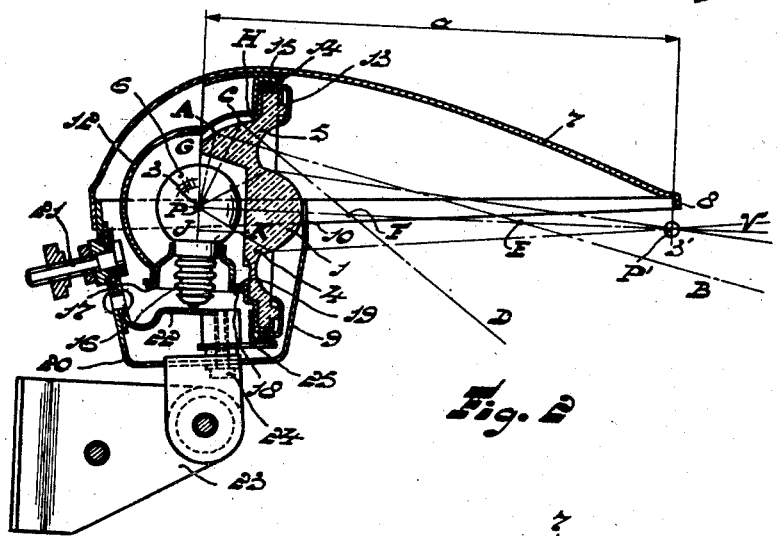
INVENTORS
JAN BERGMANS &
WILHELMUS LAMBERTUS VERVEST
BY
ATTORNEY Patented Dec. 18, 1951

2,578,962

UNITED STATES PATENT OFFICE 2,578,962

VEHICLE LAMP WITH AN OPTICAL SYSTEM FOR UNIFORM ROAD LIGHTING

Jan Bergmans and Wilhelmus Lambertus Vervest, Eindhoven, Netherlands, assignors, by mesne assignments, to Hartford National Bank and Trust Company, Hartford, Conn., as trustee Application May 7, 1946, Serial No. 667,882
In the Netherlands May 9, 1941

Section 1, Public Law 690, August 8, 1946
Patent expires May 9, 1961

9 Claims. (Cl. 240—41.3)

1

The usual bicycle lamps are so constructed that the cooperation of the lamp and the optical means provided in the lamp has the effect of producing a beam which, as regards its shape, corresponds to the headlight of a motorcar lamp. Cyclists frequently show a tendency to adjust their lamps, as is usual with motorcar lamps, in such manner that the light beam produced extends substantially horizontally. The parts of the roads located close to a cyclist are thus almost not lighted, while only a weak lighting on the road surface is produced at a very large distance from the cyclist (for example at 50 to 100 metres). In contradistinction to what is desirable for motorcar drivers, for cyclists such a method of lighting is of not the least use and, in addition, has a disturbing effect on the traffic coming from the opposite direction.

Usually the position of the known bicycle lamp is so adjusted that the center of the produced beam of light is directed to a point on the road surface which is located at about 7 to 10 metres in front of the cyclist. In this position of the lamp a very bright luminous spot is produced on the said point of the road. The remainder of the road surface lighted by the lamp has a considerably smaller brightness with the result that a cyclist, whose eye is adjusted to the maximum brightness in its field of view, takes little advantage of the light present on the road outside the region with the maximum brightness. With some known lamps it is endeavoured to obviate this drawback by giving the lamp itself or the optical means cooperating therewith a stray effect.

For suitable lighting for a bicycle it is necessary in view of the low speed of the cyclist that the road should be made bright for the cyclist up to a distance of from 20 to 40 metres. In order that the cyclist be able to take full advantage of such lighting, and in accordance with the present invention, care must be taken that the road for the cyclist be of as uniform a brightness as possible through the region in which the bicycle lamp throws its light on the road.

The lamp made according to the present invention satisfies this condition. It produces a sufficient amount of light on the road surface over a width of about 6 to 10 metres in the vicinity of the lamp. With this new and novel lamp the differences in brightness on the road, as seen by the rider of the bicycle are much smaller than with the known lamps, so that this cyclist receives full advantage of the light thrown on the road.

The bicycle lamp according to the invention is characterized by optical means which at a distance of the order of magnitude of 3 to 15 cms. in front of the filament of the lamp produces a point of convergency or a collection of points of convergency of that part of the light emitted by the filament which is beamed by the centrally located part of the optical system, whereas the parts of the optical system which are located more adjacent to the exterior direct the light emitted by the filament in such manner that substantially all these light rays intersect a plane containing the filament and the point of convergency in points which are closer to the filament than the point or the points of convergency produced by the central part of the optical system.

In this lamp the centrally located part of the optical system provides the lighting of that part of the road surface which is located at a rather considerable distance in front of the lamp. A separate part of the optical system, viz. the part located more adjacent to the exterior, provides the lighting of the road surface in the vicinity of the bicycle and produces at the same time a sufficient lighting of the sides of the road. This manner of directing the light by the optical system offers the advantage that this optical system may have small dimensions. The lamp according to the invention thus provides a lighting of the road surface which is highly uniform for the cyclist making it possible to discern not only obstacles at a rather considerable distance in front of the lamp, but also properly to observe the part of the road surface which is more adjacent thereto.

In one advantageous form of the lamp of the invention the transverse dimensions of the optical system in particular may be made small if those light rays which are directed by the peripheral portion of the optical system are caused to intersect the plane passing through the filament and the point or points of convergency more closely to the filament. In this case the peripheral portions of the optical system can be rather considerably curved and made concave.

By the use of the invention it is possible in a simple manner to construct a non-glaring bicycle lamp of limited size. According to the invention, to this end the lamp may be provided with a screen which in the operating position of the lamp covers the optical system and whose extreme edge, taken from the filament, is located in or beyond the point or points of convergency and in, or in the immediate vicinity of, the plane containing the filament and the point or points of convergency. Due to the fact that in the lamp according to the invention the point or the points of convergency of the central portion of the optical system is or are located at a distance of the order of magnitude of 15 cms. in front of the filament, the size of the screen and hence of the lamp remains within limits which are in every respect permissible.

Further, in this case it is advisable to provide a second screen in the immediate vicinity of the optical system which screen, relatively to the first screen, is located on the other side of the plane passing through the filament and the point or the points of convergency and whose extreme edge is located in or in the immediate proximity of this plane. In this case the lamp is completely non-glaring, even if one is at a considerable distance therefrom.

Although it is conceivable to give the optical system solely the form of a mirror, in order to produce a high illumination level at points on the road at a great distance from the lamp it is advisable that the optical system should be constituted by a central portion having the shape of a circular lens and by an annular mirror which surrounds this lens. The annular mirror may be interrupted at its bottom side, taken in the operating position of the lamp. However, if desired, the central portion of the lens may alternatively be not circular, but have, for example, an elliptical or any other shape.

It is simple to make the concave mirror from one or more totally reflecting bounding surfaces of a glass or a vitreous body since the lens, particularly if it is integral with the glass or the vitreous body of which one of the bounding surfaces operates as a concave mirror, may preferably be constituted by some kind of transparent artificial resin or a similar material.

To ensure accurate adjustment of the lamp and hence of the filament contained in it relatively to the optical system, it is advisable according to the invention that the lamp should be provided with centering means, for example a centering flange, which is forced against an abutment arranged preferably so as to be unmovable relatively to the optical system.

In order that the invention may be more clearly understood and readily carried into effect, it will now be described more fully by reference to the accompanying drawing.

Fig. 1 illustrates schematically in perspective the operation of the optical system.

Fig. 2 shows a longitudinal section of the lamp according to the invention.

Fig. 3 is a bottom view of the lamp.

Referring first to Fig. 1, the optical system is constituted by a central part, which in this case has the form of a lens 1, and by a surrounding lens having a reflecting back surface to form a concave annular mirror 2. The horizontally stretched filament of an electric incandescent lamp, which itself is omitted here for simplicity's sake, is indicated by 3. The centrally located part P of this filament is projected in point P' by the lens 1. Passing through the filament 3 and point P' there is imagined a plane V which in the operating position of the lamp slightly slopes downwards. The other parts of the filament are also projected in the plane V by the lens 1; at the points of their images a number of points of convergency occurs. Thus, the zigzag line 3' in Fig. 1 represents the magnified image of the filament 3 which is produced by the lens 1. According to the invention, the distance between the filament 3 and the collection of points of convergency 3', which distance is designated $a$ in Fig. 1, amounts to about 3 to 15 cms.

Fig. 1 also shows a few light rays which emanate from the central part P of the filament 3 and are directed by the part of the optical system adjacent to the exterior (in this case the annular mirror 2). These light rays are indicated PAB and PCD. The figure shows that the first-mentioned light ray intercepts the plane V in E and the light ray PCD in F. It can be seen from the figure that the light ray PCD, which is reflected by a part of the annular mirror remote from the center of the system, intersects the plane V at point F, which is located closer to the filament than the corresponding intersecting point E of the light ray PAB with the plane V.

With the aid of the light rays shown in Fig. 1 it will be proved further how the light distribution on the road surface is provided by the bicycle lamp according to the invention. Those light rays which are beamed by the lens 1 and thus produce the image 3' of the filament serve to light that part of the road surface which is located at a great distance, for example 15 to 25 metres, in front of the bicycle. These light rays have a very high candle-power. The light rays which are reflected by the annular mirror 2 provide for the lighting of that part of the road surface which is more proximate to the bicycle. Those rays which are directed by the upper part of the annular mirror 2 have in particular the task to light that region of the road surface which is located immediately in front of the bicycle. Since the annular mirror shown in Fig. 1 has the shape of a revolution formed body the parts of this mirror which are located more laterally will reflect the light in the same manner as the upper part but, owing to their position relatively to the road surface, they will light this road surface in regions which are located more laterally from the region directly in front of the bicycle. A lighting of the road surface which is highly uniform for the eye is thus obtained over a reasonable width (up to 6 to 10 metres) and a reasonable length (up to 25 to 35 metres), in which comparatively small differences in brightness occur which at any event are considerably smaller than the differences in brightness produced by the usual bicycle lamps, so that the lighting obtained with the aid of the lamp according to the invention is much more efficient than that obtained with the lamps used hitherto.

Since the peripheral portions of the optical system direct the light rays so as to intersect the plane V comparatively close to the filament 3, this optical system may have a rather considerable curvature and thus have small dimensions.

Fig. 2 is a longitudinal sectional view of the lamp according to the invention in which the described operation of the optical system occurs. In this lamp the optical system is designated 4. The lens used therein is designated 1, the annual mirror indicated by 2 in Fig. 1 here being constituted by the totally reflecting bounding surface GH of the glass body 5 which is integral with the centrally located lens 1.

Since in this case the lower part of the annular mirror is not required for the operation of the lamp, it is omitted in this construction, the lower limitation of this mirror being designated JK in the figure. The bulb of an electric incandescent lamp 6 exactly fits into the cavity in the optical system which is visible in Fig. 2, the filament of this bulb, which is horizontally stretched, being designated 3, as before. As it follows from Fig. 2, the optical system is so placed relatively to the lamp that this system in the operative part thereof receives and utilises the light emitted by the lamp through an angle of about 180°. Further, this figure shows the passage of the plane V represented in Fig. 1, the light rays PAB and PCD with their associated intersecting points P and E with the plane V being represented for clearness' sake. In Fig. 2 the collection of points of convergency produced by the beaming of the light by the lens 1 is also designated 3'.

From the figure it ensues further that in this form of construction a screen 7 is provided whose extreme edge 8 is located slightly beyond the collection of points of convergency 3' in the immediate vicinity of the plane V. This screen prevents light rays which may produce glare to the traffic from the opposite direction from passing out of the optical system. Since the distance a is small, the dimensions of the lamp remain within permissible limits; the lamp shown in the figure is illustrated approximately on the scale 1 : 1. The lamp comprises, in addition, a second screen 9 which is located in the immediate proximity of the optical system 4 and whose upper edge 10 is also located in the vicinity of the plane V. This screen prevents glare from the lamp at a great distance.

Mounting the lamp on a bicycle is effected in such manner that the lower bounding edge of the screen 7 extends horizontally. The upper edge 10 of screen 9 terminates in the plane of the bounding edge of the screen. In addition, to prevent glare to drivers of vehicles occupying a slanting position in front of or laterally from the lamp, the screen has the shape shown in Fig. 3.

In order to utilize also at least in part the light radiated by the lamp 6 to the back, a convex mirror 12 is arranged behind the lamp.

The structure of the lamp is as follows:

The optical system 4 is set in a metal ring 13 clamped in a holder 14. This holder is secured, for example by soldering, to the upper part of the screen 7. Intermediate the rings 13 and 14 is provided the metal flange 15 which forms part of the convex mirror 12. The latter exhibits on its lower side an aperture through which the lamp 6 may be placed in the optical system. The base 16 of the lamp has soldered on it a metal ring 17 which at its bottom end is provided with a centering flange 18 which is forced against the bottom edge 19 of the aperture in the convex mirror 12. The lamp and hence the filament contained in it is thus adjusted relatively to the optical system. If desired the centering flange 18 may be provided with a flat side, due to which the lamp in the tangential direction can occupy only one position relatively to the optical system so that it is ensured that the filament 3 occupies the correct position.

The bottom part of the lamp is constituted by a cup 20 whose front is constituted by the screen 9 previously referred to. This cup contains also the supply device constituted by a cable connection device 21 and a supply contact 22 which forces the centering flange 18 of the lamp against the associated abutment of the optical system. The bottom part also comprises the device for securing the lamp to a bicycle, which part is designated 23 in the figure. The upper and the lower parts of the lamp are secured together by two screws 24 which bear against the bottom side of the cup 20 and fit into nuts which occur in protrusions 25 with which the ring 14 is provided.

For changing the lamp it is only necessary to unscrew the screws 24 so that the upper screen 7 together with the optical system and the mirror 12 may be removed from the cup 20. The lamp 6 may then be changed, whereupon the two parts of the lamp casing may be secured again to each other by means of the screws 24.

In conclusion, the lamp according to the invention may be changed in a very simple manner into a lamp which satisfies the relevant regulations for the lighting of bicycles in time of war for the purpose of protection against air-raids. To this end, the screen 7 has provided under it a screen which covers the front surface of the optical system except for a few small apertures. In this case the screen 7 prevents excessive light from being radiated in upward directions.

What we claim is:

1. A vehicle lamp comprising a casing member provided with an opening, an optical system mounted in said opening, and a lamp having a filament and positioned within said casing and arranged adjacent to said optical system, said optical system comprising a centrally arranged lens portion and an annular portion surrounding said central portion, said centrally arranged portion having light refracting surfaces converging light from said filament to a first point spaced from about 3 to about 15 centimeters in front of said filament, and said annular portion having a light reflecting surface converging light from said filament to a series of second points intersecting a plane passing through said filament and said first point at portions of said plane intermediate to said filament and said first point.

2. A vehicle lamp comprising a casing member provided with an opening, an optical system mounted in said opening, and a lamp having a filament and positioned within said casing and arranged adjacent to said optical system, said optical system comprising a centrally arranged lens portion and an annular portion surrounding said central portion, said centrally arranged portion having light refracting surfaces converging light from said filament to a first point spaced from about 3 to about 15 centimeters in front of said filament, and said annular portion having a concave mirror light reflecting surface converging light from said filament to a series of second points intersecting a plane passing through said filament and said first point at portions of said plane intermediate to said filament and said first point.

3. A vehicle lamp comprising a casing member provided with an opening, an optical system mounted in said opening, a lamp having a filament and positioned within said casing and arranged adjacent to said optical system, and a hood member extending from said casing member, said optical system comprising a centrally arranged lens portion and an annular portion surrounding said central portion, said centrally arranged portion having light refracting surfaces converging light from said filament to a first point spaced from about 3 to about 15 centimeters in front of said filament, said annular portion having a light reflecting surface converging light from said filament to a series of second points intersecting a plane passing through said filament and said first point at portions of said plane intermediate to said filament and said first point, and said hood member in its operative position covering the said optical system and extending above the said plane and beyond the said first point.

4. A vehicle lamp comprising a casing member provided with an opening, an optical system mounted in said opening, a lamp having a filament and positioned within said casing and arranged adjacent to said optical system, a screening member, and a hood member extending from said casing member, said optical system comprising a centrally arranged lens portion and an annular portion surrounding said central portion, said centrally arranged portion having light refracting surfaces converging light from said filament to a first point spaced from about 3 to about 15 centimeters in front of said filament, said annular portion having a light reflecting surface converging light from said filament to a series of second points intersecting a plane passing through said filament and said first point at portions of said plane intermediate to said filament and said first point, said screening member being secured to said casing and extending over said opening with the upper edge thereof located in the proximity of said plane, and said hood member in its operative position covering the said optical system and extending above the said plane and beyond the said first point.

5. A vehicle lamp comprising a casing member provided with an opening, an optical system mounted in said opening, a lamp having a horizontally arranged filament and positioned within said casing and arranged adjacent to said optical system, and a screen member, said optical system comprising a centrally arranged circular and convex lens portion and an annular portion surrounding said central portion, said centrally arranged portion having light refracting surfaces converging light from said filament to a first point spaced from about 3 to about 15 centimeters in front of said filament, said annular portion having a light reflecting surface converging light from said filament to a series of second points intersecting a plane passing through said filament and said first point at portions of said plane intermediate to said filament and said first point, and said screening member being secured to said casing and extending over said opening to block light passing through the lower portion of said annular portion.

6. A vehicle lamp comprising a casing member provided with an opening, an optical system mounted in said opening, and a lamp having a filament and positioned within said casing and arranged adjacent to said optical system, said optical system comprising a centrally arranged lens portion and an annular portion surrounding said central portion, said centrally arranged portion having light refracting surfaces converging light from said filament to a first point spaced from about 3 to about 15 centimeters in front of said filament, and said annular portion having a concave mirror total reflection limiting surface arranged within said casing and converging light from said filament to a series of second points intersecting a plane passing through said filament and said first point at portions of said plane intermediate to said filament and said first point.

7. A vehicle lamp comprising a casing member provided with an opening, an optical system mounted in said opening, and a lamp having a filament and positioned within said casing and arranged adjacent to said optical system, said optical system comprising a centrally arranged lens portion and an annular portion surrounding said central portion, said centrally arranged portion having an outer light refracting surface converging light from said filament to a first point spaced from about 3 to about 15 centimeters in front of said filament, and said annular portion having a concave mirror light reflecting surface extending within said casing and forming with said centrally arranged portion a recess within which said lamp is positioned, said annular portion converging light from said filament to a series of second points intersecting a plane passing through said filament and said first point at portions of said plane intermediate to said filament and said first point, said centrally arranged portion and said annular portion jointly receiving light emitted by said filament through an angle of about 180°.

8. A vehicle lamp comprising a casing member provided with an opening, an optical system mounted in said opening, a socket member within said casing, a lamp having a filament and mounted in said socket and arranged adjacent to said optical system, and a mirror member mounted in said casing behind the said filament, said optical system comprising a centrally arranged lens portion and an annular portion surrounding said central portion, said centrally arranged portion having a convex light refracting surface converging light from said filament to a first point spaced from about 3 to about 15 centimeters in front of said filament, and said annular portion having a light reflecting surface converging light from said filament to a series of second points intersecting a plane passing through said filament and said first point at portions of said plane intermediate to said filament and said first point.

9. A vehicle lamp comprising a casing member having a base portion and a cover portion secured together to form an enclosure provided with an opening, an optical system mounted in said opening, a lamp having a filament, socket supporting means secured to said cover portion for positioning said lamp in fixed relationship to said optical system, a mirror member secured to said cover portion and arranged behind said lamp, said optical system comprising a centrally arranged lens portion and an annular portion surrounding said central portion, said centrally arranged portion having a convex light refracting surface converging light from said filament to a first point spaced from about 3 to about 15 centimeters in front of said filament, and said annular portion having a concave mirror light reflecting surface converging light from said filament to a series of second points intersecting a plane passing through said filament and said first point at portions of said plane intermediate to said filament and said first point, a screen member secured to said base portion and extending over said opening with the upper edge thereof located in the proximity of said plane, and a hood member secured to said cover portion and in its operative position covering the said optical system and extending above the said plane and beyond the said first point.

JAN BERGMANS.
WILHELMUS LAMBERTUS VERVEST.

REFERENCES CITED

The following references are of record in the file of this patent:

UNITED STATES PATENTS

| Number | Name | Date |
|---|---|---|
| 2,084,245 | De Aranzadi e Irujo | June 15, 1937 |
| 2,229,693 | Dietrich | Jan. 28, 1941 |

FOREIGN PATENTS

| Number | Country | Date |
|---|---|---|
| 726,859 | France | Mar. 19, 1932 |
| 881,960 | France | Feb. 8, 1943 |